Oct. 10, 1950     W. F. RENTSCH     2,525,241
ATTACHMENT FOR ACETYLENE CUTTING TORCHES
Filed July 21, 1947     2 Sheets-Sheet 1
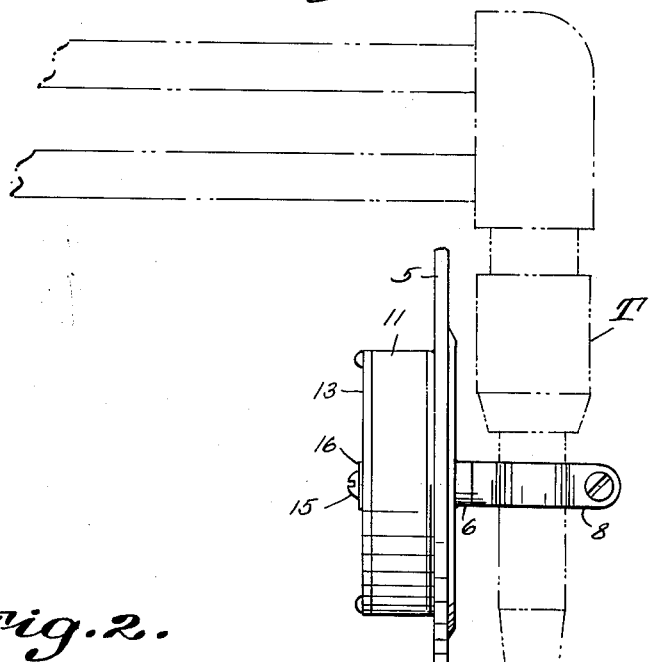
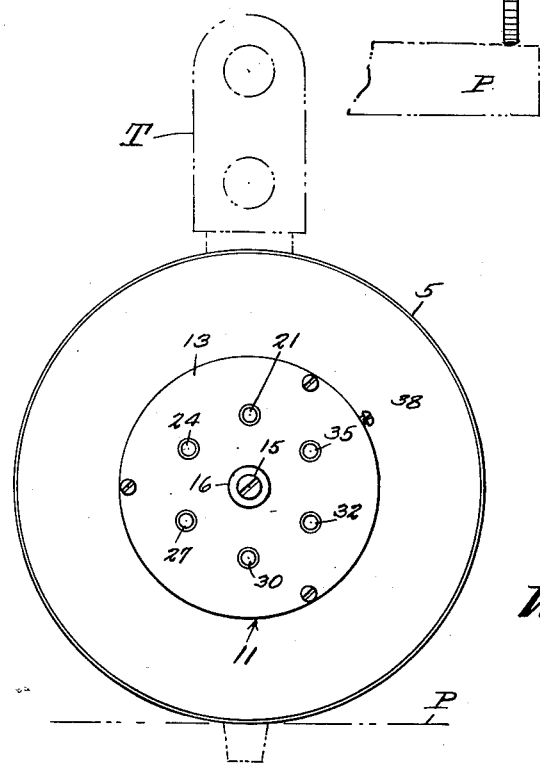
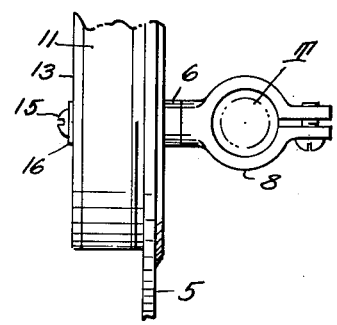
Walter F. Rentsch
INVENTOR
BY *C. A. Snowles*
ATTORNEYS.

Oct. 10, 1950 W. F. RENTSCH 2,525,241
ATTACHMENT FOR ACETYLENE CUTTING TORCHES
Filed July 21, 1947 2 Sheets-Sheet 2

Walter F. Rentsch
INVENTOR
BY CA Snow & Co.
ATTORNEYS.

Patented Oct. 10, 1950

2,525,241

UNITED STATES PATENT OFFICE 2,525,241

ATTACHMENT FOR ACETYLENE CUTTING TORCHES

Walter F. Rentsch, San Francisco, Calif.

Application July 21, 1947, Serial No. 762,519

2 Claims. (Cl. 266—23)

This invention relates to an attachment for an acetylene cutting torch, whereby the travel of the torch during cutting operation is evenly and smoothly stabilized, so as to result in a correspondingly smooth and even cut.

An important object of the invention is to provide an attachment of the character described that will be unusually light and compact in assembly, whereby the attachment may be secured to and carried by the tip of the torch, so as to have all the flexibility, ease of operation, and versatility of a hand tool.

A further important object of the invention is to provide a torch attachment which, while at all times fully discharging in an efficient manner the stated function of stabilizing the travel of the torch, will yet permit burning horizontally, vertically, and overhead, with equal ease.

Another important object is to permit stabilization of the torch while beveled cuts of various angularity are made.

Another important object is to permit use of the device on either flat or curved beds, and without the necessity of any track or other directional control.

Briefly, the invention comprises a nonrotatable shaft clampable in adjusted position to the tip of a torch, a single drive wheel being rotatable on the shaft. A gear box is fixedly connected to the drive wheel, in which is contained a gear train, including a low-mass inertia wheel, the gear train being powered by rotation of the drive wheel, and moving around the shaft in a planetary relation thereto.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a side elevational view of the attachment, an acetylene torch carrying the device being shown in dotted lines, and a portion of a plate over which the attachment is moving being also shown in dotted lines.

Figure 2 is a rear elevational view.

Figure 3 is a side elevational view showing the torch-engaging clamp in an adjusted position, portions of the attachment being broken away.

Figure 4:
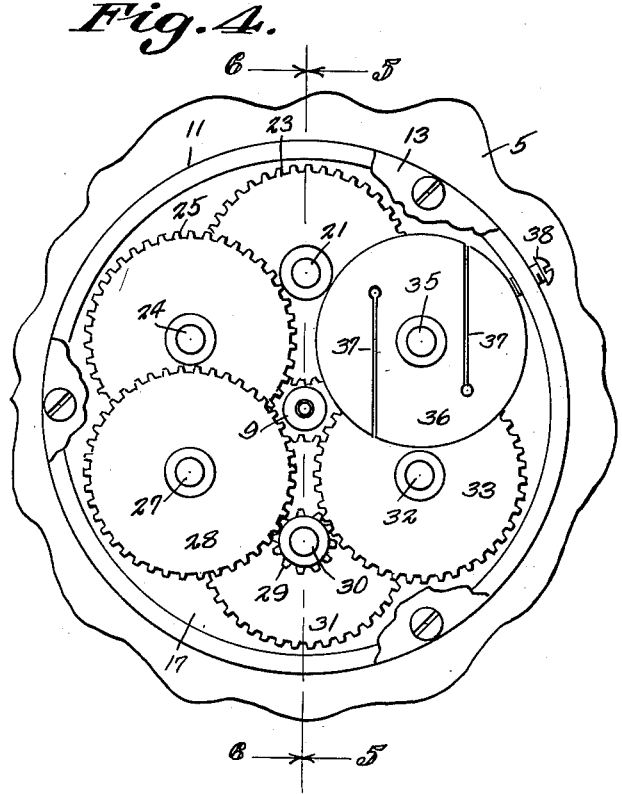
Figure 4 is a rear elevational view, portions of the drive wheel and gear box cover being removed, showing in elevation a gear train housed within the gear box.

Referring to the drawings in detail, 5 designates a drive wheel, that constitutes a support for the attachment, and for the torch T that carries the attachment. The drive wheel 5 also constitutes the means for imparting the necessary movement to a gear train embodied in the attachment, to be described hereinafter in detail.

From one face of the drive wheel 5 projects a hub 6, in which is a bushing 7. A clamp 8 attachable to the tip of a torch T abuts at its inner end against the projecting hub 6. Rigid with the clamp 8, and preferably formed integrally therewith, is a stationary shaft 9 that is extended through bushing 7, the drive wheel 5 being rotatable on this shaft.

Figure 5:
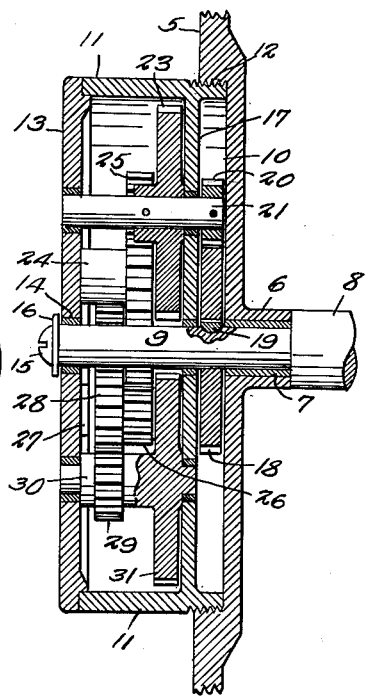
Figure 5 is a view taken on line 5—5 of Figure 4, looking in the direction of the arrows.
Figure 6:
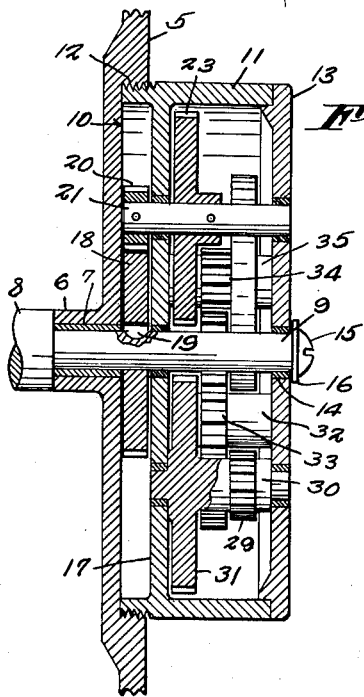
Figure 6 is a view taken on line 6—6 of Figure 4, looking in the direction of the arrows.
Figure 7:
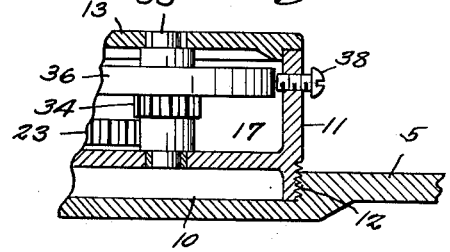
Figure 7 is a transverse sectional view through the gear box, portions being broken away, showing the mounting of the inertia wheel.

As best shown in Figures 5 and 6, the other face of the drive wheel 5 is formed with a circular recess 10 for the reception of one end of a circular gear box 11, which is removably but fixedly attached to the wheel 5 by a threaded connection 12. The gear box 11 is substantially flat, and at its opposite end is provided with a removable cover 13.

Centrally disposed in the removable cover 13 is a bushing 14 for the end of the stationary shaft 9, and to prevent withdrawal of the shaft 9 from the gear box during operation of the attachment, a screw 15 is threadable into the end of the shaft, washer 16 being interposed between the head of the screw and the cover 13.

From the above, it is seen that the drive wheel and gear box rotate as a unit on the stationary shaft 9. If desired, the drive wheel can be moved along a plate P although as will be obvious, the wheel can travel along the surface of the work itself, with torch T being adjusted longitudinally of the clamp 8.

Referring to Figures 5 and 6, the gear box 11 is formed with an inner wall 17, that is preferably spaced a short distance from the inner wall of the recess 10 of the wheel 5, the inner wall 17 constituting a bearing plate.

A spur gear 18 is carried by the shaft 9, and is fixed against rotation by means of a key 19. A pinion 20 is in continuous mesh with gear 18, pinion 20 being connected to one end of a shaft 21 for rotation therewith. Shaft 21 is journaled in the inner wall 17 and cover 13.

From the above, it is seen that as drive wheel 5 rotates, pinion 20 and shaft 21 are caused to rotate on their own axes, and in an orbit around the periphery of the stationary gear 18, in a planetary gear arrangement.

Fixed to shaft 21 for rotation thereby is gear 23, which meshes with a pinion carried by a shaft 24 journaled for rotation in the cover 13 and inner wall 17. Shaft 24 rotates gear 25, meshing with pinion 26 on shaft 27. Shaft 27 carries gear 28, that meshes with a pinion 29 on a shaft 30. Gear 31, rotated by shaft 30 meshes with a pinion on shaft 32, that rotates gear 33. The gear 33 meshes with a pinion 34 on shaft 35.

Rotatable by and with the shaft 35 is a low-mass inertia wheel 36. Referring to Figure 4, the inertia wheel 36 is slit tangentially, as at 37, and it is thus seen that as the inertia wheel rotates at a rapid rate, it will constitute a governor by reason of the spreadable portions thereof defined by the slits 37. An adjusting screw 38 is threadable in the wall of the gear box 11, and is capable of adjustment so that as the inertia wheel rotates, the screw will engage it suitably upon spreading thereof, whereby to provide a proper regulation of speed therefor.

The gear train described above is so arranged as to gear the inertia wheel up to a speed of approximately two thousand revolutions to one revolution of the drive wheel 5. An important characteristic of the invention, in this connection, is that the low-mass, high speed inertia wheel incorporated therein, powered by a gear train assembly as described, allows immediate locomotion of the attachment, without the expenditure of any appreciable time in bringing the inertia wheel up to a normal running speed. This permits unusual starting ease, so that for all practical purposes, the torch immediately begins its stabilized movement, from the start of the cut.

Other important characteristics of the device are also considered worthy of note, among them its unusually compact form, providing a light tool that is carried by the torch, thus providing all the flexibility of a hand tool.

In operation of the attachment, the torch tip T is first adjustably clamped to the attachment, and is manually grasped.

If desired, a plate P may be placed upon the work as a support for the drive wheel 5. The plate P can if desired be grooved, for special types of work, but this is not a requirement in operation of the device, and in fact even the plate may be dispensed with. A simple chalk line can in most cases suffice to provide a directional guide. As the burning begins, the wheel 5 is guided along the desired line, and immediately from the start of the operation, a full stabilizing effect is had upon the movement, with the device being moved by its own momentum almost from the first movement of the drive wheel. In practice, it has been found that stabilization is obtained in the device as much or more by the friction governing, than by the flywheel effect, and this accounts for the starting ease.

Should it be desired that a beveled cut be made, wheel 5 is moved along its directional line in a position of angularity to the surface of the work, rather than the perpendicular position illustrated in Figure 1. Burning of a vertically disposed piece of work, or overhead burning, is also permitted in the operation of a device constructed in accordance with the invention.

It may be noted that in the use of a device constructed in accordance with the invention, a flat bed is not necessary to its operation.

What is claimed is:

1. In an attachment for a cutting torch a torch-gripping clamp; a shaft rigid with and extending therefrom; a sun gear rigid with the shaft; a planetary train of gears arranged about the sun gear and in mesh at one end with the sun gear; an inertia wheel driven by the other end of the train; a support-contacting drive wheel having a central opening receiving the shaft for rotation of the drive wheel upon the shaft, said drive wheel comprising the single point of support for said attachment; and a gear box affixed directly to and rotatable with and by said drive wheel, said gear box enclosing the sun gear, gear train, and inertia wheel, the inertia wheel and the gears of said train being journaled in the walls of the gear box, for bodily rotation of said inertia wheel and planetary gears around the sun gear upon rotation of the drive wheel responsive to shifting of the attachment over a supporting surface, for driving of the gear train by the sun gear.

2. In an attachment for a cutting torch a torch-gripping clamp; a shaft rigid therewith; a sun gear rigid with the shaft; a large drive wheel having a central opening receiving the shaft, said drive wheel being rotatable upon the shaft, the drive wheel having a circular recess formed in one face thereof and concentric with the drive wheel, the wall of said recess being threaded; a generally flat circular gear box threaded into said recess and rotatable with the drive wheel, the gear box having outer and inner walls spaced apart to provide bearing plates, the inner wall of the gear box being spaced from the drive wheel to provide a chamber for the sun gear; a train of gears enclosed by the gear box; an inertia wheel driven by said train of gears; and stub shafts rotatable with the inertia wheel and the gears of the train of gears respectively and journaled in said bearing plates at locations spaced from the center of rotation of the drive wheel, for rotation of the inertia wheel and train of gears bodily on travel of the drive wheel across a supporting surface.

WALTER F. RENTSCH.

REFERENCES CITED

The following references are of record in the file of this patent:

UNITED STATES PATENTS

| Number | Name | Date |
| --- | --- | --- |
| 1,718,192 | Crowe | June 28, 1929 |
| 1,773,664 | Eberle | Aug. 19, 1930 |
| 1,823,194 | Gray | Sept. 15, 1931 |
| 1,829,592 | Hasse | Oct. 27, 1931 |
| 1,830,539 | Hancock | Nov. 3, 1931 |
| 2,442,505 | Millett | June 1, 1948 |

FOREIGN PATENTS

| Number | Country | Date |
| --- | --- | --- |
| 318,703 | Great Britain | Sept. 12, 1929 |